(12) United States Patent
Shaben

(10) Patent No.: US 7,001,263 B2
(45) Date of Patent: Feb. 21, 2006

(54) AIR FLOW MONITORING AND CONTROL SYSTEM WITH REDUCED FALSE ALARMS

(75) Inventor: William A. Shaben, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 10/912,902

(22) Filed: Aug. 6, 2004

(65) Prior Publication Data

US 2005/0048896 A1 Mar. 3, 2005

Related U.S. Application Data

(60) Provisional application No. 60/495,226, filed on Aug. 14, 2003.

(51) Int. Cl.
*F24F 7/00* (2006.01)
(52) U.S. Cl. .............................. 454/67; 454/49; 454/56
(58) Field of Classification Search .................. 454/67, 454/49, 56, 57, 58, 59; 126/299 F, 299 R, 126/299 D
See application file for complete search history.

(56) References Cited

U.S. PATENT DOCUMENTS

| | | | | |
|---|---|---|---|---|
| 4,040,042 A | * | 8/1977 | Mayer | 454/340 |
| 4,160,407 A | * | 7/1979 | Duym | 454/61 |
| 4,934,256 A | | 6/1990 | Moss et al. | 454/61 |
| 5,170,673 A | * | 12/1992 | Ahmed et al. | 73/865.9 |
| 5,215,497 A | * | 6/1993 | Drees | 454/61 |
| 5,232,152 A | * | 8/1993 | Tsang | 236/44 A |
| 5,439,414 A | | 8/1995 | Jacob | 454/61 |
| 5,562,537 A | | 10/1996 | Zver et al. | 454/61 |
| 5,882,254 A | * | 3/1999 | Jacob | 454/61 |
| 5,988,860 A | * | 11/1999 | Hefferen et al. | 700/276 |
| 6,302,779 B1 | * | 10/2001 | Ryan et al. | 454/61 |
| 6,350,194 B1 | * | 2/2002 | Haugen et al. | 454/56 |
| 6,623,538 B1 | * | 9/2003 | Thakur et al. | 55/385.2 |

* cited by examiner

*Primary Examiner*—Derek S. Boles
(74) *Attorney, Agent, or Firm*—Brown & Michaels, PC

(57) ABSTRACT

An air flow monitoring and control system with reduced false alarms includes an alarm sensor for monitoring air flow in a fume hood or the like, set to provide a warning if air flow drops below a predetermined amount. A local controller monitors the alarm, and disables it when the hood is set to reduced air flow, whether by a local timer or by command of a central control system. Optionally, the controller itself can operate a variable speed drive to reduce air flow on a timed basis, and the controller can communicate with facility management through a dialer or the Internet, or can interface with a central control for the facility through a facility bus.

20 Claims, 2 Drawing Sheets

AIR FLOW MONITORING AND CONTROL SYSTEM WITH REDUCED FALSE ALARMS

REFERENCE TO RELATED APPLICATIONS

This application claims an invention which was disclosed in Provisional Application No. 60/495,226, filed Aug. 14, 2003, entitled "AIR FLOW MONITORING AND CONTROL SYSTEM WITH REDUCED FALSE ALARMS". The benefit under 35 USC §119 (e) of the U.S. provisional application is hereby claimed, and the aforementioned application is hereby incorporated herein by reference in its entirety.

BACKGROUND OF THE INVENTION

1. Field of the Invention

The invention pertains to the field of monitoring and control of air flow handling devices such as laboratory fume hoods. More particularly, the invention pertains to methods of avoiding false alarms in air flow monitoring systems for air handling systems.

2. Description of Related Art

Laboratory fume hoods have long been used to extract fumes from the vicinity of laboratory workers. Typically, fume hoods provide an enclosure around and above the experimental area or laboratory table, from which an exhaust fan draws air. Room air flows into the hood from vents or an open front to replace the air drawn out by the hood The extracted air is exhausted through appropriate ductwork to the atmosphere in a safe area, typically the roof of the laboratory building. Makeup air flows into the laboratory to replace the room air exhausted by the hoods.

Because of the need to maintain airflow through the hoods for safety reasons, it is important to monitor the hoods and make sure that sufficient air is flowing whenever the laboratory is in use. Failure of a fan motor or plugging of air filters, inlets or outlets, could lead to a dangerous diminution in air flow. Therefore, fume hood airflow alarms are provided for this purpose. These alarms monitor the air flow in the hood or the ductwork leading to or from the hood, whether directly or by monitoring pressure differentials, and warn personnel when the flow drops below a predetermined set point.

Moss, U.S. Pat. No. 4,934,256, "Fume Hood Ventilation Control System", shows a fume hood equipped with such an airflow monitoring system. U.S. Pat. Nos. 5,439,414 and 5,562,537, assigned to Landis & Gyr Powers, Inc., of Buffalo, N.Y., for "Networked Fume Hood Monitoring System" are examples of networked systems for monitoring a plurality of fume hoods in a facility.

Overall ventilation for laboratory buildings is usually provided by one or more air handling units (otherwise known as Heating, Ventilation and Air Conditioning or HVAC) which draw in outside air, heat or cool it as needed, and distribute the air to the various areas in the building. Air vents and, if needed, exhaust fans, provide an exit route for the conditioned air.

In recent years, concerns for energy conservation have led to buildings being made ever more air-tight and energy efficient. This has resulted in a number of problems in laboratory or factory buildings and other similar facilities in which there are a large number of devices such as lab hoods, paint booths, assembly line process equipment using chemicals, stove hoods, etc., extracting conditioned air from the building. When these devices are on, a significant amount of air is pulled from the interior of the building and exhausted to atmosphere. With the building being made as air-tight as possible, it is no longer feasible to depend on leaks around and through windows and doors to replace the extracted air flow. Outside air must be drawn in through the building's air handling equipment to make up for the air leaving through the hoods. Therefore, it is important that the air handling equipment be running when the hoods are on.

It has become common in recent years for all of the HVAC and other machinery in a facility to be controlled and monitored centrally, with a facility network bus running around the building providing communications for data and commands for all of the equipment. Application Specific Controllers (ASCs) provide interfacing between one or more pieces of equipment and the bus, and a Network Control Module (NCM) connected to the bus monitors and controls the equipment through the ASCs. The NCM may be a stand-alone system or might communicate with one or more conventional microcomputers to provide data monitoring, control and alarm functions using custom or vendor-supplied software, such as the "Metasys" software from Johnson Controls, of Milwaukee, Wis. Johnson Controls also manufactures ASCs and NCMs which are useful with the present invention.

If the hoods are left on when there is no laboratory activity, a great deal of energy is wasted drawing in outside air through the air handlers, conditioning it, and blowing it out through the roof through the hoods. It would seem logical, then, to shut off hoods and other exhaust devices when there is no longer any need for them. This may be done by manual controls on the hoods, but laboratory users can forget to shut down equipment when they leave. Simple time clocks can provide a shut-off function at night, as well.

However, if the building is energy efficient, it is not advisable to simply shut down all of the exhaust equipment, as it is important to keep at least a minimal air flow through the facility to maintain fresh air and keep the temperature within limits. Better than just shutting off the hoods, then, is to reduce the air flow through the devices through variable speed drives on the exhaust fans. Thus, when the laboratory shuts down at night, the hood fans can be automatically slowed down to 25%–50% of normal speed.

A problem arises when this is done. Even though the hoods are not shut off completely, the air flow monitors in the fume hoods will detect the reduction in air flow, and at some point will set off a low air flow alarm. The alarms can be set to a low enough flow that the minimum flow should not set them off, but it is not practical to set this limit too low, or the alarm would not perform its function during the day when it is needed to perform its safety function. Small natural variations in flow can thus cause annoying false alarms as the hood monitors incorrectly interpret a brief drop or rise in hood flow at night as a failure in ventilation. Many facilities have dealt with this by either disconnecting the alarms, to the detriment of facility safety, or keeping the hoods running wastefully 24 hours a day, requiring increased costs of running the HVAC when it is not needed.

SUMMARY OF THE INVENTION

The invention presents a system for monitoring and controlling air flow in a facility which reduces the number of false alarms due to incorrect sensing of reduced air flow in exhaust devices.

In the simplest embodiment of the system, an alarm sensor monitors air flow in a fume hood or the like, set to provide a warning if air flow drops below a predetermined amount. A local controller monitors the alarm, and disables it when the hood is set to reduced air flow, whether by a local timer or by command of a central control system. Optionally, the controller itself can operate a variable speed drive to reduce air flow on a timed basis, and the controller can communicate with facility management through a dialer or the Internet, or can interface with a central control for the facility through a facility bus.

In a preferred embodiment, the system is implemented on a facility-wide basis. Alarms on a plurality of fume hoods or similar devices communicate with an ASC, which is, in turn connected to a facility network bus. At least one air handler is also connected to the bus, providing signals for its status and accepting commands for its operation. The air handler provides control for variable speed drives on the fume hoods, so that when the air handler is set to a night-time setback condition the fans in the hoods are slowed down. When this happens, the ASC disables the alarms in the hoods, so that the reduced air flow does not result in false air flow alarm conditions. Manual overrides on the hoods may be provided to turn the air handler back on, which would in turn set the fume hoods back to full operation and re-enable the alarms.

DETAILED DESCRIPTION OF THE INVENTION

Figure 1:
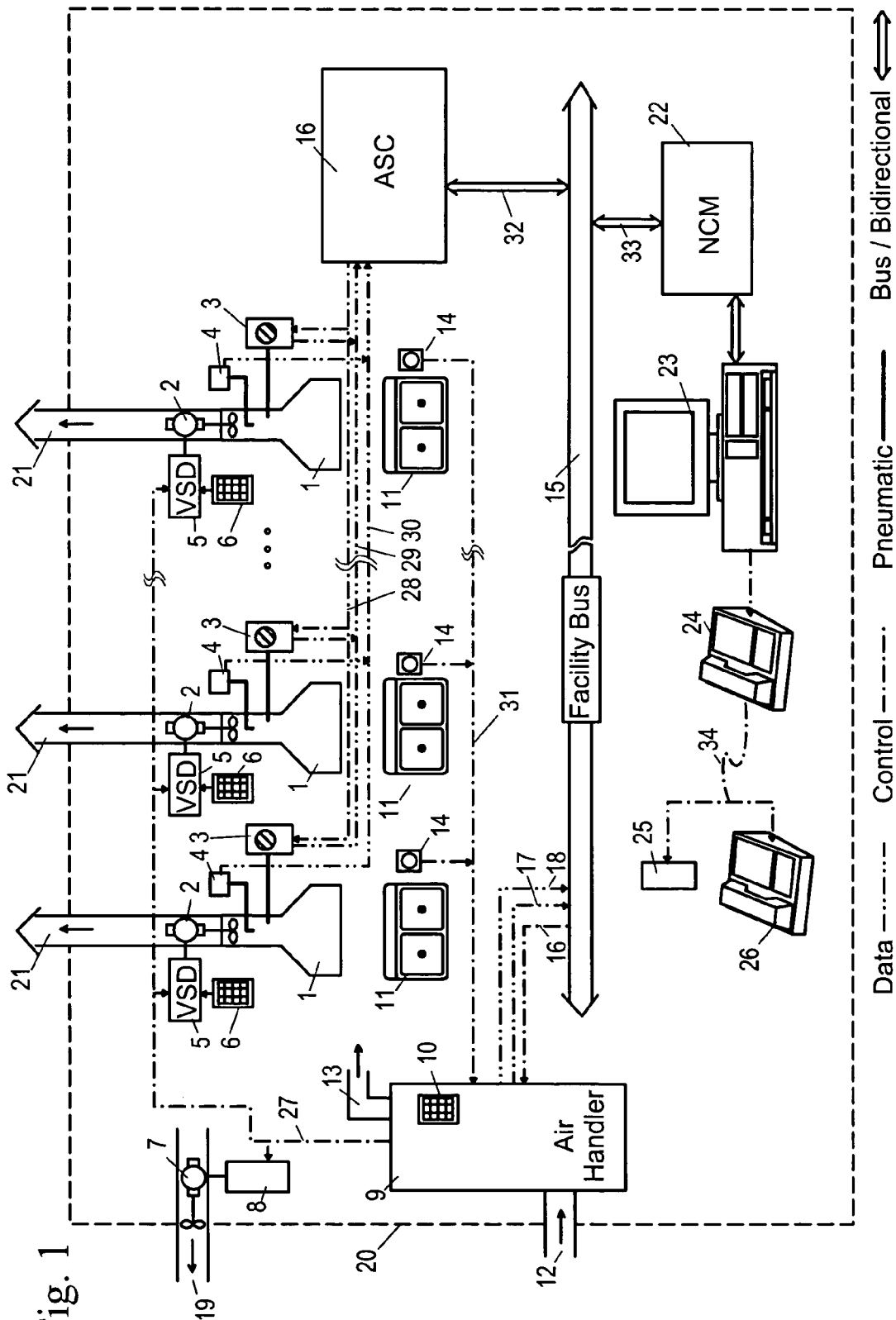
FIG. 1 shows a block diagram of the system of the invention

FIG. 1 shows a block diagram of the invention, as it would be implemented in a laboratory building (20) having a number of fume hoods (1). It will be understood that the invention may be used in other applications than fume hoods, wherever there are apparatus which exhaust air from a building, such as spray booths, assembly line ventilators for chemical baths, range or industrial cooking hoods, etc. Also, although the example of FIG. 1 is shown with a single air handler with three associated fume hoods and an exhaust fan, the invention may also be used with any mixture of air handlers, exhaust devices, building zones, etc.

Referring to FIG. 1, the dashed line represents a laboratory building (20) or possibly an air handling zone within a larger facility. Outside air (12) is drawn into air handler (9), heated or cooled as required (and possibly filtered, humidified or de-humidified depending on individual building needs), and conditioned air (13) is sent through the normal building (or zone) air ducts.

The air handler (9) is connected to a facility bus (15), which is a communications line running throughout the facility for communications and control of the various building functions. The air handler (9) sends information about its operation (17) to the bus, and receives operational commands (16) from the bus (15). In particular, the air handler will report its fan status (18)—that is, whether or not the handler is drawing in outside air (12). Manual controls (10) may also be provided to allow local control of the air handler (9).

One or more exhaust fans (7) may be provided to exhaust building air (19) to the outside. A fan controller (8) allows the exhaust fan to be started or stopped, or its speed regulated, as might be required.

Within the laboratories, each experimental position (11) has a fume hood (1) with an exhaust fan (2) which draws air from the hood and exhausts it through ducts to stacks (21) on the roof of the building (or some other safe place remote from air intakes and casual traffic). A variable speed drive (VSD) (5) on each fan allows the speed of the fans to be adjusted from the full speed required by normal daytime operation to a lesser speed (25%–50%) during night setback or if the hood is not required. A manual keypad (6) on each VSD allows manual control of fan speed, and the setback speed may be set by the keypad as well. Alternatively, one or more of the VSD's (5) could be replaced by an on/off control in which the fans are completely shut off during setback periods.

Each of the VSD's (5) and, optionally, the exhaust fan controller (8) are connected to the air handler by a setback line (27). A signal on the setback line (27) causes the fans (2) and (7) to revert to their lower nighttime speeds, reducing the air flow out of the building. The setback line (27) might be as simple as a contact closure indicating "reduce speed" (or, alternatively, "increase speed", if the setback line were used in reverse to indicate normal operation), or might actually set a specific setback amount, as the system design requires. In any event, it is the air handler (9) which sets back the exhaust devices (2) and (7) through line (27).

Under normal operation, then, the system might work on a daily schedule as follows:

TABLE 1

|  | 0700–1700 | 1700–0700 |
| --- | --- | --- |
| Air Handler | ON | OFF |
| Fume Hoods | ON-Full Speed (60 Hz) | 25%–50% (15 Hz–30 Hz) |
| Exhaust Fan | ON | OFF |

If someone is working in a laboratory at night, they should be able to override this reduction, however, and the air handlers would need to increase their output to compensate for the increased air flow. Override switches (14) on each lab position (11) signal the air handler (9) through line (31) to switch on. This, in turn, causes the air handler (9) to turn off setback signal (27) (or send a "cancel setback" command), which switches the fume hood fans (2), and optionally the exhaust fan (7), back to full speed "ON" operation.

Figure 2:
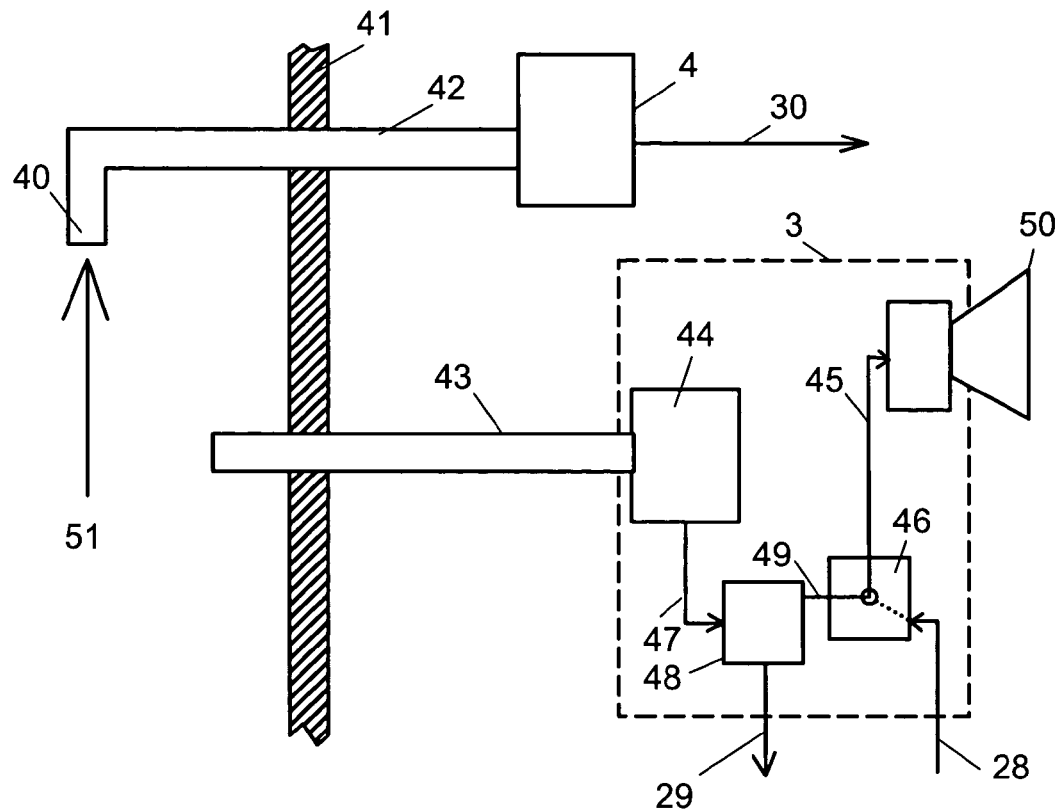
FIG. 2 shows a detail block diagram of a fume hood alarm and monitor

An airflow monitor and alarm unit (3) is connected to each of the fume hoods (1), as can be seen in detail in the block diagram of FIG. 2. A pneumatic tube (43) leads into the exhaust duct (41) from the hood. Air flow (51) in the duct (41) induces a partial vacuum in line (43) by the venturi effect, and this is detected by pressure sensor (44). The sensed pressure is provided to a comparator (48), which compares the pressure to a desired set point. If the pressure drops below the set point, the comparator outputs a "low pressure" signal (29), and activates alarm (50) by turning line (49) on. An alarm disable switch or relay (46) interrupts lines (29) and (49), silencing the alarm (50) if an "alarm disable" signal (28) is present. In the past, this "alarm disable" line was not commonly used, or would simply be connected to a local switch for disabling the alarm entirely.

The airflow monitor and alarm unit (3) may be custom built for the purpose, or could be a commercially available unit such as the "Safe Aire® 54L0335" manufactured by Fisher Hamilton LLC, of Two Rivers, Wis.

Optionally, a "pitot tube" (40) may be placed in the duct (41) which produces a positive pressure in line (42) from a "ram air" effect. This pressure is detected by detector (4)

which sends a simple binary (yes/no) signal (30) to indicate that there is, or is not, air flow (51) in the duct (41). Alternatively, one of the commercially available vane switches could be used for the same purpose.

The "low pressure" signal (29) (and optional "air flow" signal (30)) are routed to an Application Specific Controller (ASC) (16) which is assigned to the particular laboratory, building zone or other area covered by the air handler (9) and hoods (1). According to the teachings of the invention, an output from the ASC (16) is connected to the "alarm disable" lines (28). The ASC (16) is connected to the facility bus (15) by a data line (32). The ASC might be any of the commercially available units, such as the model DX9100 manufactured by Johnson Controls, Milwaukee, Wis., or could be custom built.

A Network Control Module (22), usually at a central location in the facility (20), is also connected to the facility bus (15) by a data line. The NCM (22) performs the functions involved in controlling and monitoring the facility, which might include not only the HVAC functions but also various other alarms and sensors, as desired. The NCM might be any of the commercially available units, such as the Johnson Controls model NCM350, or could be custom built. Control software such as "Metasys" from Johnson Controls, allows programmability of the NCM.

A microcomputer (23) is usually provided for programming and monitoring the NCM (22), and may be connected to a telephone dialer or modem (24) so that any alarms may be relayed to one or more telephones (26) or pagers (25) over the normal telephone lines (34). The NCM and microcomputer can be programmed to provides detailed reports in order to provide archived history data, alarm data and trend data.

In normal operation, then, as noted in FIG. 1, above, the air handler (9) would be switched on and off according to a time schedule. This switching could be done by the NCM (22) sending commands through its data link (33) to the facility bus (15), and then to the air handler (9) through line (16). Alternatively, a time program in the air handler (9) itself could perform this function.

When the air handler (9) is in normal daytime mode, the air handler (9) "setback" signal (27) is "off", and the fume hood fans (2) and exhaust fans (7) are thus fully on. The full air flow (51) in the ducts (41), detected by sensor (44) is more than the set point in the comparator (48), and the low pressure line (29) is "off". The air flow sensor (4) detects the air flow, and sends a confirming "air flow on" signal (30) to the ASC (16). Also, the air handler (9) sends a "fan on" signal (18) to the ASC. These signals (18), (29) and (30) allow the ASC (16) to confirm that the system is operating properly, and if any of them are abnormal, allows the ASC to raise an alarm condition through the NCM (22).

At the desired "night setback" time (1700/5PM in Table 1), the air handler (9) is switched "off", and the handler asserts "setback" line (27). The exhaust fan controller (8) shuts off the exhaust fan (7), and the VSD's (5) set the fume hood fans (2) to their preset "setback" speed.

In the prior art, this is the point at which trouble might arise. As the VSD's (5) cut the fume hood fans (2) back to 25%–50% of normal speed, the air flow in the ducts (41) is reduced. Depending on the set point chosen in comparator (48), this might immediately cause a "low pressure" condition, or it might be just sufficient to stay above the limit set. If there is any reduction in air flow, though, whether through a partially clogged filter, or a temporary disruption in airflow, the "low pressure" condition will be detected, and comparator (48) would set off alarm (50) and send a "low pressure" condition (29) to the ASC (16). The ASC (16) would relay the alarm to the NCM (22), which would call for help or set off its own false alarms.

According to the teachings of the invention, however, these false alarms are avoided. The ASC (16) detects the "fan off" (18) signal from the air handler (9), and knows that it is now in "night setback" mode. Therefore, it asserts the "alarm disable" line (28), which prevents the alarms (50) from sounding, so long as the system is in setback mode.

Once the air handler (9) returns to normal operation, whether through the normal timed schedule or because of an override switch (14), it turns off the setback (27), returning the fans (2) to full operation, and sends "fan on" signal (18) to the ASC (16), which ceases to assert "alarm disabled" (28). The alarm and monitoring unit (3) is back in full operation, and the alarm is active.

This allows for full implementation of HVAC economizer modes without compromising fume hood safety, and, at the same time, allows the end user of a chemical fume hood to override HVAC economizer modes in order to conduct research in a safe environment, by disabling and/or enabling the fume hood alarm parameters during occupied or unoccupied periods.

Figure 3:
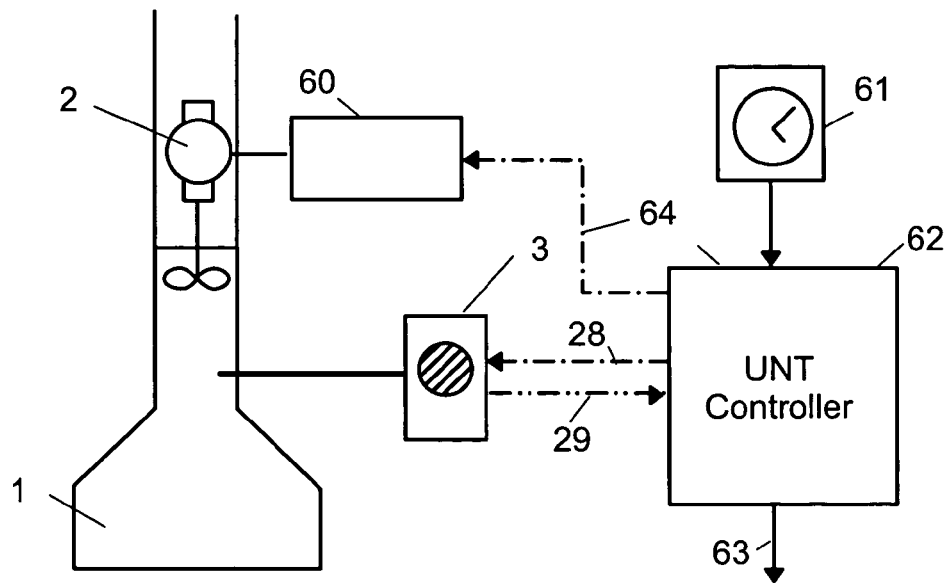
FIG. 3 shows a block diagram of a simple embodiment of the invention, implemented for a single fume hood.

FIG. 3 shows an implementation of the invention in a simpler form. As in FIG. 1, a fume hood (1) has a fan (2) to draw air from the hood. The fan (2) is controlled by a controller (60), which could be a VSD, or simply an on/off power controller.

An airflow monitor and alarm unit (3) detects air flow in the hood (1) and sends a "low pressure" signal (29) to a Unitary Network Terminal (UNT) (62). The "alarm disable" line (28) is connected to an output of the UNT (62) A time clock (61) signals the UNT (62) as to the setback status (alternatively, the UNT might have an internal clock—it will be understood that the clock in the diagram could be separate or part of the UNT).

In operation, during the day cycle, the clock (61) signals the UNT (62) that the day cycle is active. The airflow monitor (3) is active, and the alarm is "on", so if the air flow in the hood (1) drops below the preset minimum, the alarm in the monitor will go off. Optionally, the UNT (62) will detect the "low pressure" signal (29) and output an alarm message (63) through one of the methods known to the art, such as asserting an alarm on the facility bus, calling a pager on a dialer, or powering a remote alarm device.

When the night setback cycle starts, the clock (61) signals the UNT (62), which detects that the night cycle has begun from the clock signal, and asserts the "alarm disable" line (28) to shut off the alarm in the airflow monitor (3) and eliminate false "low pressure" signals (29).

The next level of complexity of the system would be to have the UNT (62) control the fan (2) through a setback line (64) to the fan controller (60). During the day cycle, the UNT (62) commands the fan controller (60) to turn on the fan (2). During the night setback cycle, the UNT (62) sends a setback signal on line (64) to cause the controller (60) to shut off the fan (2) (or reduce its speed). Alternatively, the clock (61) could assert the setback line (64) directly, instead of the line being an output of the UNT.

Additional devices can be added to the UNT, as desired, and the system can be expanded, within the teachings of the invention.

Accordingly, it is to be understood that the embodiments of the invention herein described are merely illustrative of the application of the principles of the invention. Reference herein to details of the illustrated embodiments is not intended to limit the scope of the claims of the nonprovisional application which will be filed, which will themselves recite those features regarded as essential to the invention.

What is claimed is:

1. An air flow monitoring and control system with reduced false alarms, comprising:
   a) alarm sensor means for monitoring air flow in a fume hood or the like, set to provide a warning if said air flow drops below a predetermined amount; and
   b) local controller means for monitoring said alarm, wherein said controller means disables said alarm, when said fume hood or the like receives reduced air flow, whether by a local timer or by command of a central control system.

2. The system of claim 1, wherein said controller means operates a variable speed drive to reduce air flow on a timed basis.

3. The system of claim 2, wherein said controller means communicates with facility management through a dialer or the Internet, or interfaces with a central control for the facility through a facility bus.

4. The system of claim 1, wherein alarms on a plurality of fume hoods or similar devices communicate with an ASC, which is, in turn connected to a facility network bus.

5. The system of claim 4, wherein at least one air handler is also connected to the bus, providing signals for its status and accepting commands for its operation.

6. The system of claim 5, wherein the air handler provides control for variable speed drives on the fume hoods, so that when the air handler is set to a night-time setback condition the fans in the hoods are slowed down.

7. The system of claim 6, wherein the ASC disables the alarms in the hoods, so that the reduced air flow does not result in false air flow alarm conditions.

8. The system of claim 5, wherein manual overrides on the hoods may be provided to turn the air handler back on, which would in turn set the fume hoods back to full operation and re-enable the alarms.

9. The system of claim 5, in which the means for monitoring air flow comprises a pilot tube placed in the duct which produces a positive pressure from a ram air effect, and the pressure is detected by a detector which sends a simple binary signal to indicate that there is, or is not, air flow in the duct.

10. The system of claim 5, in which the means for monitoring air flow comprises a vane switch.

11. The system of claim 5, wherein a microcomputer is provided for programming and monitoring a network control module, and is connectable to a telephone dialer or modem so that any alarms may be relayed to one or more telephones or pagers over telephone lines.

12. The system of claim 11, wherein the network control module and microcomputer can be programmed to provide detailed reports in order to provide archived history data, alarm data and trend data.

13. The system of claim 1, wherein an airflow monitor and alarm unit detects air flow in the hood and sends a low pressure signal to a Unitary Network Terminal.

14. The system of claim 13, wherein the alarm disable line is connected to an output of the Unitary Network Terminal.

15. The system of claim 13, wherein a time clock signals the Unitary Network Terminal as to the setback status.

16. The system of claim 13, wherein the Unitary Network Terminal controls the fan through a setback line to the fan controller.

17. The system of claim 13, wherein during the day cycle, the Unitary Network Terminal commands the fan controller to turn on the fan.

18. The system of claim 13, wherein during the night setback cycle, the Unitary Network Terminal sends a setback signal on line to cause the controller to shut off the fan or reduce its speed.

19. The system of claim 11, wherein the clock asserts the setback line directly.

20. The system of claim 5 in which the means for monitoring air flow comprises a venturi located in the duct which induces a partial vacuum by the venturi effect, and this is detected by a pressure sensor, wherein the sensed pressure is provided to a comparator, which compares the pressure to a desired set point; such that if the pressure drops below the set point, the comparator sends a simple binary signal to indicate that there is, or is not, air flow in the duct.

* * * * *

UNITED STATES PATENT AND TRADEMARK OFFICE
CERTIFICATE OF CORRECTION

PATENT NO. : 7,001,263 B2
DATED : February 21, 2006
INVENTOR(S) : William A. Shaben It is certified that error appears in the above-identified patent and that said Letters Patent is hereby corrected as shown below:

Column 7,
Line 40, "pilot" should be changed to -- pitot --.

Signed and Sealed this

Second Day of May, 2006

JON W. DUDAS
*Director of the United States Patent and Trademark Office*